US010040445B2

(12) United States Patent
Schaefer et al.

(10) Patent No.: US 10,040,445 B2
(45) Date of Patent: Aug. 7, 2018

(54) DRIVETRAIN FOR A MOTOR VEHICLE, AND METHOD FOR OPERATING A DRIVETRAIN OF SAID TYPE

(71) Applicant: BorgWarner Inc., Auburn Hills, MI (US)

(72) Inventors: Michael Wilhelm Schaefer, Ketsch (DE); Hans Juergen Hauck, Schwaebisch Hall (DE)

(73) Assignee: BorgWarner, Inc., Auburn Hills, MI (US)

( * ) Notice: Subject to any disclaimer, the term of this patent is extended or adjusted under 35 U.S.C. 154(b) by 80 days.

(21) Appl. No.: 15/118,615

(22) PCT Filed: Feb. 12, 2015

(86) PCT No.: PCT/US2015/015587
§ 371 (c)(1),
(2) Date: Aug. 12, 2016

(87) PCT Pub. No.: WO2015/126719
PCT Pub. Date: Aug. 27, 2015

(65) Prior Publication Data
US 2017/0057489 A1    Mar. 2, 2017

(30) Foreign Application Priority Data

Feb. 22, 2014  (DE) .......................... 10 2014 002 549
Sep. 25, 2014  (DE) .......................... 10 2014 014 236

(51) Int. Cl.
*B60W 20/40*    (2016.01)
*B60K 6/40*     (2007.10)
(Continued)

(52) U.S. Cl.
CPC ............... *B60W 20/40* (2013.01); *B60K 6/36* (2013.01); *B60K 6/387* (2013.01); *B60K 6/40* (2013.01);
(Continued)

(58) Field of Classification Search
CPC ...... B60W 20/40; B60W 10/02; B60W 10/08; B60W 30/19; B60W 2510/1015;
(Continued)

(56) References Cited

U.S. PATENT DOCUMENTS 6,251,042 B1 *  6/2001  Peterson .................. B60K 6/48
                                                    477/3
9,821,797 B2 *  11/2017 Yoon ...................... B60W 20/17
(Continued)

FOREIGN PATENT DOCUMENTS

| JP | 2002-349685 A | 12/2002 |
| JP | 2013 124032 A | 6/2013 |
| JP | 2013-129274 A | 7/2013 |

OTHER PUBLICATIONS

PCT Int'l App. No. PCT/US2015/015587 filed Feb. 12, 2015 dated May 21, 2015—International Search Report and Written Opinion.

*Primary Examiner* — David J Hlavka (57) ABSTRACT

The present invention relates to a drivetrain having a first clutch, which has an input side and an output side which is selectively connectable in terms of rotational drive to the input side, and having a transmission, which has a transmission shaft which is connected or connectable in terms of rotational drive to the output side and which is selectively connectable in terms of rotational drive to a gearwheel by means of a second clutch, wherein a rotor of an electric machine is arranged on the output side, and the electric machine, in motor operation, can be controlled or regulated so as to cause the rotational speeds of the transmission shaft and of the gearwheel to be approximated to or aligned with (Continued)

one another before the closure of the second clutch. The present invention also relates to a method for performing gearshifts in a transmission within a drivetrain of the type according to the invention.

18 Claims, 8 Drawing Sheets (51) Int. Cl.
| | |
|---|---|
| *B60K 6/48* | (2007.10) |
| *B60K 6/547* | (2007.10) |
| *B60W 30/19* | (2012.01) |
| *B60K 6/36* | (2007.10) |
| *B60K 6/387* | (2007.10) |
| *B60W 10/02* | (2006.01) |
| *B60W 10/08* | (2006.01) |
| *F16H 3/089* | (2006.01) |
| *F16D 13/38* | (2006.01) |
| *F16D 13/52* | (2006.01) |
| *F16D 48/06* | (2006.01) |

(52) U.S. Cl.
CPC ............... *B60K 6/48* (2013.01); *B60K 6/547* (2013.01); *B60W 10/02* (2013.01); *B60W 10/08* (2013.01); *B60W 30/19* (2013.01); *F16H 3/089* (2013.01); B60K 2006/4825 (2013.01); B60W 2510/1015 (2013.01); B60W 2710/021 (2013.01); B60W 2710/081 (2013.01); B60Y 2200/92 (2013.01); B60Y 2300/19 (2013.01); B60Y 2300/42 (2013.01); *F16D 13/385* (2013.01); *F16D 13/52* (2013.01); *F16D 48/06* (2013.01); *F16D 2500/1045* (2013.01); *F16D 2500/10412* (2013.01); Y02T 10/6221 (2013.01); Y02T 10/6252 (2013.01); Y10S 903/914 (2013.01); Y10S 903/93 (2013.01); Y10S 903/946 (2013.01)

(58) Field of Classification Search
CPC ..... B60W 2710/021; B60W 2710/081; B60W 10/10; B60K 3/36; B60K 6/387; B60K 6/40; B60K 6/48; B60K 6/547; B60K 2006/4825; F16H 3/089; F60Y 2300/19; F60Y 2300/42; F60Y 2200/92; F16D 13/385; F16D 48/06; F16D 2500/10412; F16D 2500/1045; F16D 13/52
See application file for complete search history.

(56) References Cited

U.S. PATENT DOCUMENTS

| | | | |
|---|---|---|---|
| 2006/0258506 A1 | 11/2006 | Ibamoto et al. | |
| 2008/0234098 A1* | 9/2008 | Leufgen | B60K 6/36 477/5 |
| 2010/0160113 A1* | 6/2010 | Dreher | B60W 10/02 477/90 |
| 2012/0138405 A1* | 6/2012 | Falkenstein | B60K 6/48 192/3.54 |

* cited by examiner

DRIVETRAIN FOR A MOTOR VEHICLE, AND METHOD FOR OPERATING A DRIVETRAIN OF SAID TYPE

The present invention relates to a drivetrain for a motor vehicle, having a first clutch, which has an input side and an output side which is selectively connectable in terms of rotational drive to the input side, and having a transmission, which has a transmission shaft which is connected or connectable in terms of rotational drive to the output side, wherein the transmission shaft is selectively connectable in terms of rotational drive to a gearwheel, for example a floating gear, by means of a second clutch. The present invention also relates to a method for performing gearshifts in the transmission within a drivetrain of said type.

Drivetrains in motor vehicles are known from practice which have a first clutch, wherein the first clutch has an input side and an output side which is selectively connectable in terms of rotational drive to the input side. Furthermore, the known drivetrains have a transmission which has a transmission shaft which is connected or connectable in terms of rotational drive to the output side, wherein the transmission shaft is selectively connectable in terms of rotational drive to a gearwheel or floating gear, which is arranged on the transmission shaft, by means of a second clutch. In this case, the floating gear meshes in terms of rotational drive with another gearwheel on a further transmission shaft, such that the floating gear together with the other gearwheel form a gear set. As second clutch, use is generally made of so-called shift sleeves. In order to cause the rotational speeds of the transmission shaft and of the gearwheel to be approximated to or aligned with one another before the closure of the second clutch, the second clutch has a synchronizing body or synchronizing ring which, by friction, causes the rotational speeds of the transmission shaft and gearwheel to be approximated to or aligned with one another. Such embodiments have been proven in manual transmissions, but have the disadvantage of a relatively cumbersome construction and increased frictional wear, in particular with regard to the second clutch or shift sleeve. Furthermore, if the drivetrain is in the form of a drivetrain of a hybrid drive, such that the rotor of an electric machine is arranged on the output side of the first clutch, there is furthermore the problem that the additional weight of the rotor arranged on the output side of the first clutch constitutes an additional inertial mass which impedes the synchronization process.

It is therefore an object of the present invention to provide a drivetrain of the generic type which permits simple synchronization, in which the wear is reduced, and which is of relatively simple construction. The present invention is also based on the object of specifying a simplified method for performing gearshifts in a transmission within a drivetrain of said type.

Said object is achieved by means of the features specified in patent claims 1 and 12. The subclaims relate to advantageous embodiments of the invention.

The drivetrain according to the invention is in particular designed for use in a motor vehicle. The drivetrain has a first clutch which may for example be in the form of a single, starting and/or separating clutch. The first clutch has an input side and an output side which is selectively connectable in terms of rotational drive to the input side. The drivetrain furthermore comprises a transmission which has a transmission shaft which is connected or connectable in terms of rotational drive to the output side of the first clutch. The transmission shaft may for example be a transmission input shaft or a transmission shaft which is indirectly or directly downstream of the transmission input shaft in the torque flow, that is to say for example a countershaft, auxiliary transmission shaft or main transmission shaft. A gearwheel which is preferably in the form of a floating gear is arranged on the transmission shaft, wherein the transmission shaft is selectively connectable in terms of rotational drive to the gearwheel by means of a second clutch, wherein the second clutch may for example be a shift sleeve-type clutch. An electric machine is also provided in the drivetrain, such that the drivetrain may be a drivetrain for a hybrid drive. A rotor of the electric machine is in this case arranged on the output side of the first clutch, such that the rotor is indirectly or directly connected in terms of rotational drive to the output side. To realize a synchronizing action, the electric machine is designed such that, in motor operation, it can be controlled or regulated so as to cause the rotational speeds of the transmission shaft and of the gearwheel to be approximated to or aligned with one another before the closure of the second clutch. By virtue of the fact that the rotational speeds of the transmission shaft and of the gearwheel can be adapted to one another, that is to say approximated to or aligned with one another, preferably controlled or regulated to the same value, by means of the electric machine, it is for example possible, in the region of the second clutch, to dispense with the commonly used synchronizing body, that is to say for example a clutch body with friction cone and a synchronizing ring with counterpart cone, such as are commonly used in the prior art to effect a synchronizing action. In this way, not only is the frictional wear reduced, but the design of the drivetrain is also simplified, in particular with regard to the second clutch. The second clutch may thus substantially be a positively locking clutch without a friction component or with only a small friction component. Furthermore, the weight of the rotor arranged on the output side of the first clutch does not constitute a problem in terms of the synchronization, because the rotor in interaction with the stator of the electric machine effects the synchronizing action. Also, the first clutch may be configured as a wet-running clutch with the corresponding advantages, whereas only dry-running clutches are used as first clutches in the prior art.

In a preferred embodiment of the drivetrain according to the invention, means for directly or indirectly detecting the rotational speed of the transmission shaft and of the gearwheel are provided, said means interacting with a control and/or regulation device of the electric machine such that the difference between the rotational speed of the transmission shaft and the rotational speed of the gearwheel can be reduced or even eliminated. In the case of direct detection of the rotational speeds, the respective rotational speed value can be determined directly, whereas in the case of an indirect detection of the rotational speeds, the rotational speeds can be derived from other operating or structural variables.

In a particularly preferred embodiment of the drivetrain according to the invention, the rotor is arranged on the outside of the first clutch in a radial direction and/or is in a nested arrangement with the first clutch in a radial direction, in order to realize a small axial structural length of the first clutch, which is possible in particular by way of the nesting of the rotor with the first clutch in a radial direction.

In a further particularly preferred embodiment of the drivetrain according to the invention, the first clutch is in the form of a multiplate clutch. In this case, it has proven to be advantageous for the output side of the first clutch in the form of a multiplate clutch to be in the form of an outer plate carrier. This is advantageous because a particularly simple arrangement of the rotor on the output side of the first clutch is possible, and in particular, particularly simple and space-saving radial nesting of the rotor and first clutch is also possible. In this connection, it is furthermore preferable for the rotor, in this embodiment, to be arranged on an outer plate-holding section of the outer plate carrier in order to realize the arrangement of the rotor on the outside of the first clutch in the radial direction. Alternatively or in addition, in this design variant, the rotor is in a nested arrangement with a plate pack of the multiplate clutch in a radial direction, in order to reduce the axial structural length of the drivetrain.

As already indicated above, in an advantageous embodiment of the drivetrain according to the invention, the first clutch is a starting and/or separating clutch, particularly preferably a single clutch.

In a further advantageous embodiment of the drivetrain according to the invention, the first clutch is in the form of a normally closed clutch.

As already indicated above, in a particularly advantageous embodiment of the drivetrain according to the invention, the first clutch is in the form of a wet-running clutch, in order to realize a first clutch which is thermally more robust than the dry-running clutches that are commonly used as starting and/or separating clutch, wherein, in particular against the background of the synchronization being performed by means of the electric machine, the use of a wet-running clutch does not constitute a problem here in terms of the synchronizing action. In this embodiment, the first clutch is preferably arranged in a wet chamber, wherein the wet chamber is delimited by a static transmission housing bell and/or by a co-rotating clutch housing. The co-rotating clutch housing is in this case preferably fastened to the rotor, wherein the co-rotating clutch housing may in this case be formed for example by two clutch housing shells which are fastened to the rotor opposite one another, wherein the rotor itself advantageously forms a part of the clutch housing. In the design variant with a co-rotating clutch housing, it is furthermore preferable for the clutch housing to be arranged within a transmission housing bell so as to separate a dry chamber, in which the stator of the electric machine is arranged, from the wet chamber, in order that the interaction of stator and rotor is not influenced by the fluid, for example cooling or lubricating oil, within the wet chamber.

In a further advantageous embodiment of the drivetrain according to the invention, the first clutch is assigned a spring device for applying the closing force. The spring device is preferably a plate spring.

In a further preferred embodiment of the drivetrain according to the invention, the first clutch is assigned an actuating device, wherein the actuating device is preferably a hydraulic actuating device. In other words, the first clutch may also be referred to as a hydraulic clutch. The actuating device is preferably designed so as to be static or fixed with respect to the housing. In other words, the actuating device does not perform a rotational movement about the axis of rotation of the first clutch, which, in particular in the case of hydraulic actuating devices, has the effect that leakage losses can be substantially eliminated. In this embodiment, it is furthermore preferable for the actuating device to be decoupled in terms of rotational drive from the first clutch or from the spring device for applying the closing force. In this case, the decoupling in terms of rotational drive is realized preferably by means of an interposed disengagement bearing.

In a further particularly preferred embodiment of the drivetrain according to the invention, a closing force of the spring device and/or an actuating force of the actuating device is supportable or supported preferably in an axial direction, preferably by means of a securing ring, on a transmission housing or transmission housing cover, on an output shaft, that is to say for example on a crankshaft, which is connected in terms of rotational drive to the input side, of a drive unit, or on a transmission shaft.

In a further advantageous embodiment of the drivetrain according to the invention, the transmission is in the form of an automated manual transmission or automatic transmission.

In a further particularly advantageous embodiment of the drivetrain according to the invention, the transmission has at least one gear set for forming a forward gear. Consequently, the transmission can, by means of the gear set, be operated in a forward gear by way of a drive unit. Furthermore, however, the transmission can also, by means of the same gear set, be operated in a reverse gear by way of the electric machine. It is preferable here if the transmission can, by means of the same gear set, be operated in the reverse gear exclusively by way of the electric machine and/or by reversal of the rotational direction of the rotor. This embodiment has the advantage that the gear set for the reverse gear, such as is provided in conventional transmissions, can be omitted entirely, which yields a shortening of the axial structural length of the transmission and a simpler construction and a weight reduction.

The method according to the invention serves for performing gearshifts in a transmission within a drivetrain of the type according to the invention, and has the method steps described below. Firstly, the first clutch is opened. Subsequently, the electric machine is controlled or regulated in motor operation so as to cause the rotational speeds of the transmission shaft and of the gearwheel to be approximated to or aligned with one another. After the rotational speeds of the transmission shaft and of the gearwheel have been approximated to or aligned with one another, the second clutch is closed so as to produce a connection in terms of rotational drive between the transmission shaft and the gearwheel. With regard to the advantages and further design variants of the method according to the invention, reference is made to the advantages described above with reference to the drivetrain according to the invention, and to the embodiments thereof, which are applicable correspondingly to the method.

In a preferred embodiment of the method according to the invention, the rotational speed of the transmission shaft and the rotational speed of the gearwheel are indirectly or directly detected, wherein the control or regulation of the electric machine in motor operation is performed so as to reduce or eliminate the difference between the rotational speed of the transmission shaft and the rotational speed of the gearwheel.

In a further preferred embodiment of the method according to the invention, the control or regulation of the electric machine in motor operation and/or the closure of the second clutch are/is automated, that is to say involve no further action by the operator.

In a particularly preferred embodiment of the method according to the invention, the transmission is, by means of a gear set for forming a forward gear, operated in a reverse gear by way of the electric machine, preferably exclusively by way of the electric machine, and/or by reversal of the rotational direction of the rotor of the electric machine.

The invention will be explained in more detail below on the basis of exemplary embodiments and with reference to the appended drawings, in which.

Figure 1:
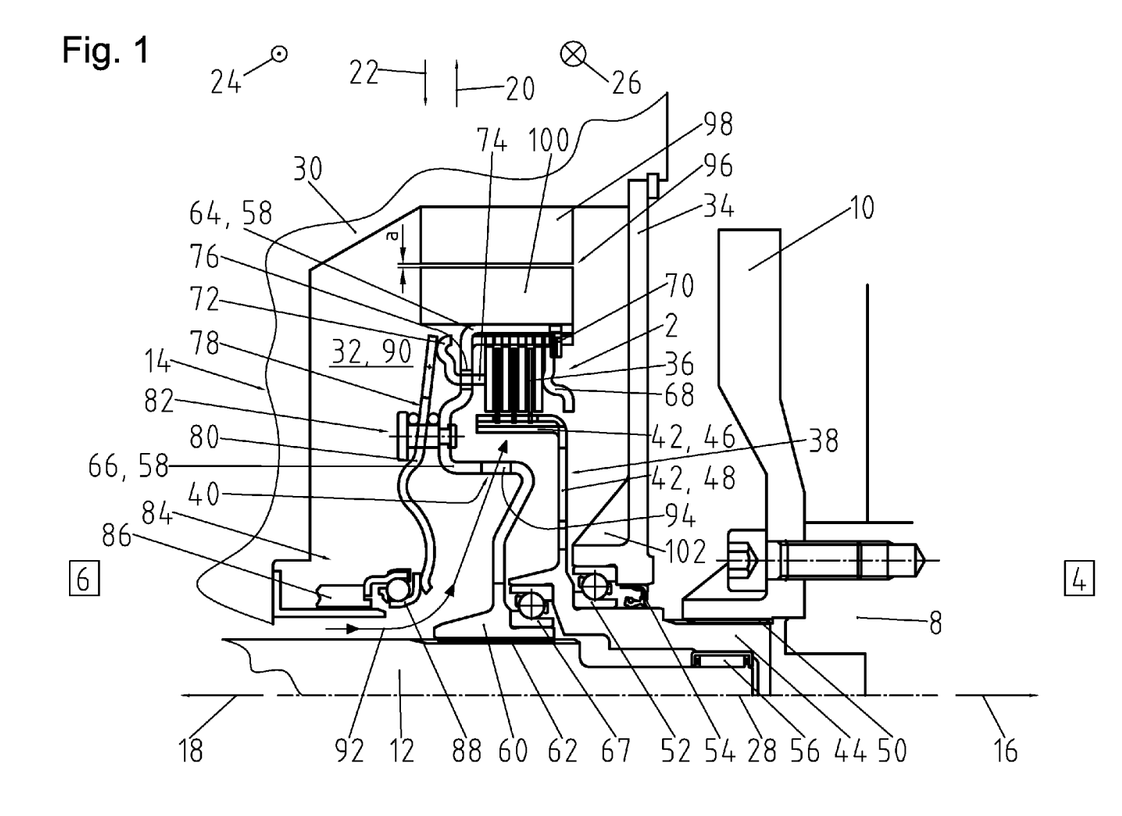
FIG. 1 shows, in a sectional illustration, a partial side view of the first clutch within the drivetrain according to the invention in a first embodiment.

FIG. 1 shows a detail from the drivetrain according to the invention with a first embodiment of the first clutch 2. The first clutch 2, which is in the form of a starting and/or separating clutch, serves for the selective transmission of torque between a drive unit 4 and a transmission 6 of the drivetrain, which are only partially and/or schematically indicated in FIG. 1. Accordingly, in FIG. 1, the end of the output shaft 8 of the drive unit 4 is indicated, with a flywheel 10 being fastened rotationally conjointly to said end, wherein the connection in terms of rotational drive to the first clutch 2, which will be described in more detail further below, is realized via the flywheel 10. By contrast, of the transmission 6, a first transmission shaft 12, which can also be referred to as transmission input shaft 12, and a transmission housing 14 are indicated. Furthermore, in FIG. 1, the mutually opposite axial directions 16, 18, the mutually opposite radial directions 20, 22 and the mutually opposite circumferential directions 24, 26 of the first clutch 2 are indicated by way of corresponding arrows, wherein both the first clutch 2 and the first transmission shaft 12 and the output shaft 8 of the drive unit 4 are rotatable about an axis of rotation 28 extending in the axial directions 16, 18. Consequently, the circumferential directions 24, 26 can also be referred to as directions of rotation 24, 26.

The transmission housing 14 has, on its end pointing in the axial direction 16, a transmission housing bell 30 which delimits an accommodating space 32 in the axial direction 18 and in the outward radial direction 20, wherein the accommodating space 32 is furthermore delimited in the axial direction 16 by a transmission housing cover 34 which is arranged detachably on the transmission housing bell 30.

The first clutch 2, which is in the form of a starting and/or separating clutch, is arranged within the accommodating space 32. In this case, the first clutch 2 is in the form of a multiplate clutch with multiple outer and inner plates which alternate with one another in the axial direction 16 or 18 and form a plate pack 36. The first clutch 2 has an input side 38 and an output side 40 which is selectively connectable in terms of rotational drive to the input side 38. The input side 38 is composed substantially of an inner plate carrier 42 and a clutch input hub 44. The inner plate carrier 42 has a substantially tubular plate-holding section 46 for the inner plates of the plate pack 36 and, adjoining the plate-holding section 46 in the axial direction 16, a radial support section 48 which extends inward in the radial direction 22 and which, at its end pointing inward in the radial direction 22, is connected rotationally conjointly to the clutch input hub 44. By contrast, the clutch input hub 44 extends in the axial direction 16 through a central opening in the transmission housing cover 34 in order to be detachably connected rotationally conjointly to the output side 8 of the drive unit 4, in this case by means of the flywheel 10, wherein the rotationally conjoint connection is realized by means of a spline toothing 50. In this case, the clutch input hub 44 is supportable or supported on the transmission housing cover 34 both in the radial direction 20 and in the axial direction 16 by means of a radial and axial bearing 52, wherein furthermore, an encircling seal 54 is provided in the radial direction 20, 22 between the clutch input hub 44 and that edge of the opening within the transmission housing cover 34 which points inward in the radial direction 22. Furthermore, the clutch input hub 44 is supported on the first transmission shaft 12 in the radial direction 22 by means of a further radial bearing.

The above-mentioned output side 40 of the first clutch 2 is formed substantially by an outer plate carrier 58 and a clutch output hub 60 which follows the outer plate carrier 58 to the inside in the radial direction 22, which clutch output hub 60 is connected rotationally conjointly to the outer plate carrier 58 and is connected in terms of rotational drive to the first transmission shaft 12, wherein the connection in terms of rotational drive is in turn realized by way of a spine toothing 62. In this case, the outer plate carrier 58 has a substantially tubular plate-holding section 64 for holding the outer plates of the plate pack 36 and, following the plate-holding section 64 in the axial direction 18, a radial support section 66 which extends inward substantially in the radial direction 22 to the clutch output hub 60. The clutch output hub 60 is supportable or supported on the clutch input hub 44 both in the radial direction 20 and in the axial direction 16 by means of a radial and axial bearing 67.

The plate pack 36 is supportable in the axial direction 16 on a support part 68 which is detachably fastened to the plate-holding section 64 by means of a securing ring 70. In the opposite axial direction 18, a force-transmitting element 72 is provided which is of substantially annular form and which has actuating fingers 74 projecting in the axial direction 16. Accordingly, proceeding from the annular force-transmitting element 72, the actuating fingers 74 extend in the axial direction 16 from that side of the radial support section 66 which faces away from the plate pack 36, through windows 76, to that side of the radial support section 66 which faces toward the plate pack 36, such that the actuating fingers 74 can be pressed in the axial direction 16 against that end of the plate pack 36 which points in the axial direction 18.

The first clutch 2 or the plate pack 36 is furthermore assigned a spring device 78 for applying the closing force of the first clutch 2, wherein the spring device 78 is formed substantially by a plate spring 80. The outer section of the plate spring 80 in the radial direction 20 can be pressed against the force-transmitting element 72, whereas the inner section in the radial direction 22 can be actuated by means of an actuating device described in more detail further below. In between, the plate spring 80 is held pivotably on a holding device 82, wherein the holding device 82 is fastened to the radial support section 66 of the outer plate carrier 58. Consequently, the plate spring 80 of the spring device 78 is merely pivotable, but in the region of the holding device 82 is not movable in translational fashion in the axial direction 16, 18 relative to the outer plate carrier 58.

As already indicated above, the first clutch 2 is assigned a hydraulic actuating device 84, wherein the actuating device 84 could basically also be a mechanical actuating device. The actuating device 84 is designed to be static, that is to say so as not to co-rotate in the circumferential direction 24, 26, and/or so as to be fixed with respect to a housing, which in this case refers to the transmission housing 14. Accordingly, the actuating device 84 has an actuating piston 86 which is displaceable in the axial direction 16, 18 and which can be driven hydraulically, said actuating piston 86 being guided in a corresponding actuating cylinder (not illustrated). In this case, the actuating device 84, more precisely the actuating piston 86, is decoupled in terms of rotational drive from the first clutch 2, or from the spring device 78 thereof, by means of a disengagement bearing 88. Consequently, not only the actuating cylinder but also the actuating piston 86 is designed to be static or fixed with respect to the housing, whereby leakage losses in the region of the hydraulic actuating device 84 can be eliminated.

The illustrated first clutch 2 is a normally-closed clutch. When the actuating piston 86 is not acted on with hydraulic pressure, said actuating piston 86 is situated in its initial position, in which the actuating piston 86 is displaced in the axial direction 18. In this case, the closing force of the plate spring 80 acts on the force-transmitting element 72, which in turn compresses the plate pack 36 and closes the first clutch 2. By contrast, when the actuating piston 86 is acted on with hydraulic pressure, it is displaced in the axial direction 16, such that the plate spring 80 is pivoted in the region of the holding device 82 and releases the force-transmitting element 72, such that the plate pack 36 is no longer compressed and the first clutch 2 is opened. In this case, both the closing force of the spring device 78 and the actuating force of the actuating device 84 are supportable or supported on the transmission housing 14, more precisely on the transmission housing cover 34 of the transmission housing 14, in the axial direction 16. Accordingly, during the opening of the first clutch 2, the closing force or actuating force acts via the holding device 82 on the outer plate carrier 58 and on the clutch output hub 60 connected thereto, wherein the latter is supported in the axial direction 16 on the transmission housing cover 34 via the radial and axial bearing 67, the clutch input hub 44 and the radial and axial bearing 52.

The first clutch 2 is in the form of a wet-running clutch. Accordingly, the first clutch 2 is arranged in a wet chamber 90 which, in the embodiment illustrated, corresponds substantially to the accommodating space 32, such that the wet chamber 90 is delimited by the static transmission housing bell 30 of the transmission housing 14 and the transmission housing cover 34. The supply of a coolant and/or lubricant, such as for example oil, to the wet chamber 90 may in this case take place via an opening in the transmission housing 14 through which the first transmission shaft 12 also extends into the accommodating space 32 or the wet chamber 90, wherein the coolant and/or lubricant supply path 92 is indicated in FIG. 1 by corresponding arrows. It can also be seen from FIG. 1 that recesses 94 are provided in the radial support section 66 of the outer plate carrier 58, which recesses allow the coolant and/or lubricant to pass through in order to ensure a good supply of coolant and/or lubricant to the plate pack 36.

As can be seen from FIG. 1, an electric machine 96 is also provided in the drivetrain, such that the drivetrain can also function as a drivetrain for a hybrid drive, in which drive can be imparted both by means of the drive unit 4 and by means of the electric machine 96. The electric machine 96 is arranged within the accomodating space 32 and has a stator 98 fixed with respect to the housing and a rotor 100 arranged within the stator 98 in the radial direction 22, wherein a gap a which is of encircling form in the circumferential direction 24, 26 is formed between the stator 98 and the rotor 100 in the radial direction 20, 22. Owing to the above-described mounting on the transmission housing cover 34 by means of the radial and axial bearings 67, 52, it is ensured that the gap a can be precisely set and maintained during operation. The rotor 100 of the electric machine 96 is arranged on and connected rotationally conjointly to the output side 40, formed by the outer plate carrier 58, of the first clutch 2. In this case, the rotor 100 is arranged on the outside of the first clutch 2 in the radial direction 20 and is in a nested arrangement with the first clutch 2 in the radial direction 20, 22. More precisely, in the illustrated embodiment, the rotor 100 is arranged on and connected rotationally conjointly to the plate-holding section 64 of the outer plate carrier 58, wherein the rotor 100 is in a nested arrangement with the plate pack 36 of the first clutch 2, formed by a multiplate clutch, in the radial direction 20, 22 in order to realize a small axial structural length of the first clutch 2 in conjunction with the electric machine 96, and thus a short axial structural length of the drivetrain as a whole.

Before the further design variants of the drivetrain are discussed in more detail with reference to FIGS. 5 to 7, further embodiments of the first clutch 2 will be described below in conjunction with the electric machine 96 with reference to FIGS. 2 to 4.

Figure 2:
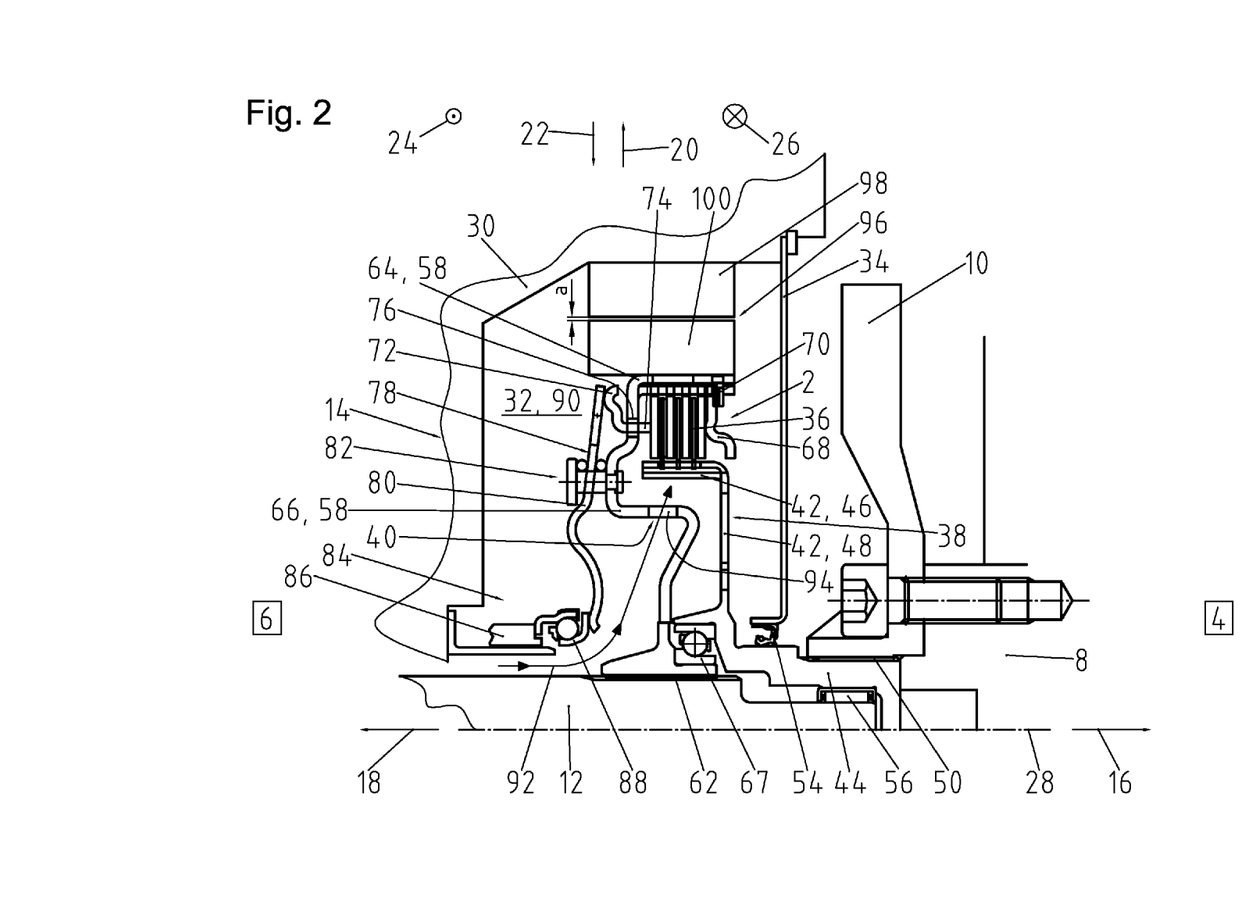
FIG. 2 shows, in a sectional illustration, a partial side view of the first clutch within the drivetrain according to the invention in a second embodiment.

FIG. 2 shows a second embodiment of the first clutch 2 in a drivetrain, wherein the second embodiment substantially corresponds to the first embodiment as per FIG. 1, such that only the differences will be discussed below, the same reference signs are used for identical or similar parts, and the above description otherwise applies correspondingly.

By contrast to the first embodiment, it is the case in the second embodiment as per FIG. 2 that the radial and axial bearing 52 is dispensed with. Consequently, the closing force and/or actuating force is not supported in the axial direction 16 on the transmission housing cover 34, which can consequently be designed with thinner walls than in the first embodiment as per FIG. 1. It is also possible for the at least one stiffening rib 102 on the transmission housing cover 34, as shown in FIG. 1, to be dispensed with. In the second embodiment as per FIG. 2, it is rather the case that the closing force of the spring device 78 and/or the actuating force of the actuating device 84 is supportable or supported in the axial direction 16 on the output shaft 8 of the drive unit 4 via the holding device 82, the radial support section 66 of the outer plate carrier 58, the clutch output hub 60, the radial and axial bearing 67, and the clutch input hub 44.

Figure 3:
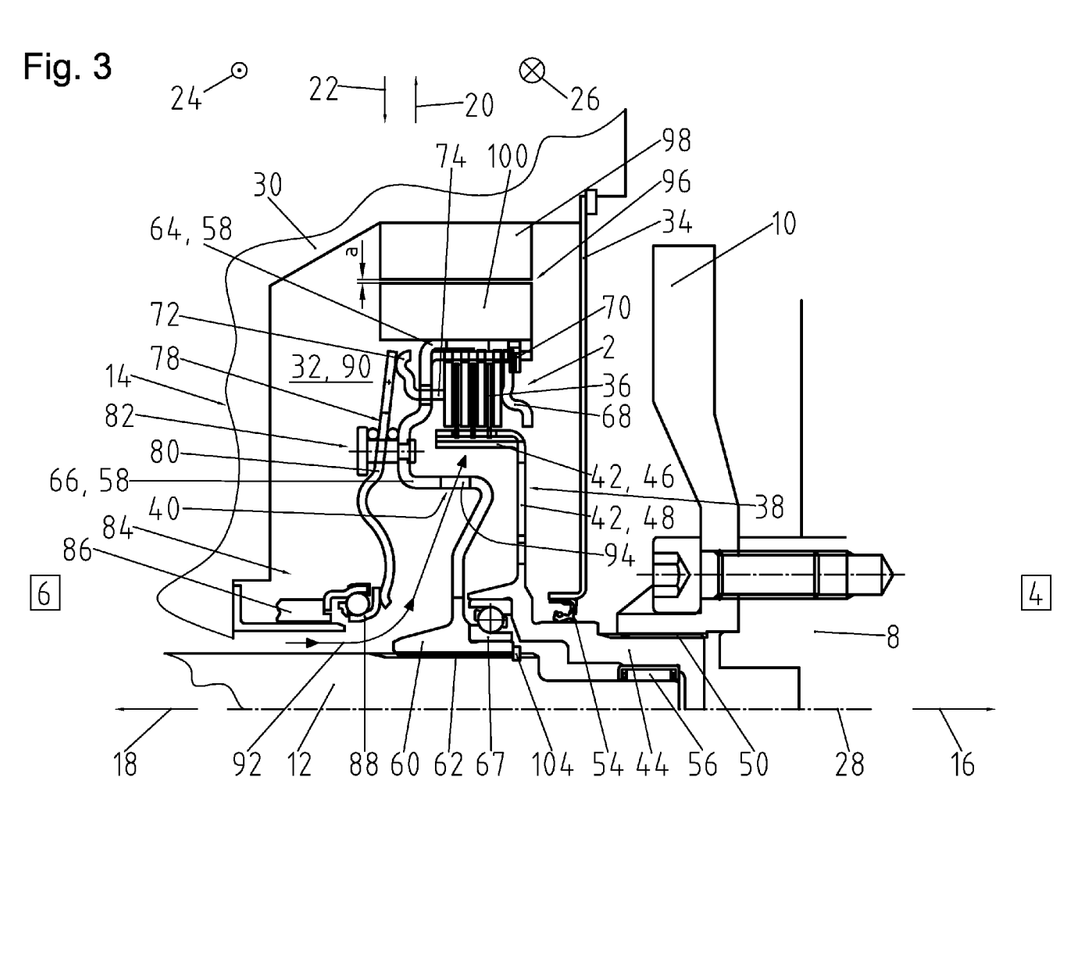
FIG. 3 shows, in a sectional illustration, a partial side view of the first clutch in the drivetrain according to the invention in a third embodiment.

FIG. 3 shows a third embodiment of the first clutch 2 in conjunction with the electric machine 96, wherein the third embodiment substantially corresponds to the second embodiment as per FIG. 2, such that only the differences will be discussed below, the same reference signs are used for identical or similar parts, and the above description otherwise applies correspondingly.

In the third embodiment, the closing force and/or actuating force is not supported on the output shaft 8, which is connected in terms of rotational drive to the input side 38, of the drive unit 4. Rather, the closing force of the spring device 78 and/or the actuating force of the actuating device 84 is supportable or supported in the axial direction 16 on the first transmission shaft 12 via the holding device 82, the radial support section 66 of the outer plate carrier 58, and the clutch output hub 60. For this purpose, the clutch output hub 60 is fixed in the axial direction 16 to the first transmission shaft 12 by means of a securing ring 104.

Figure 4:
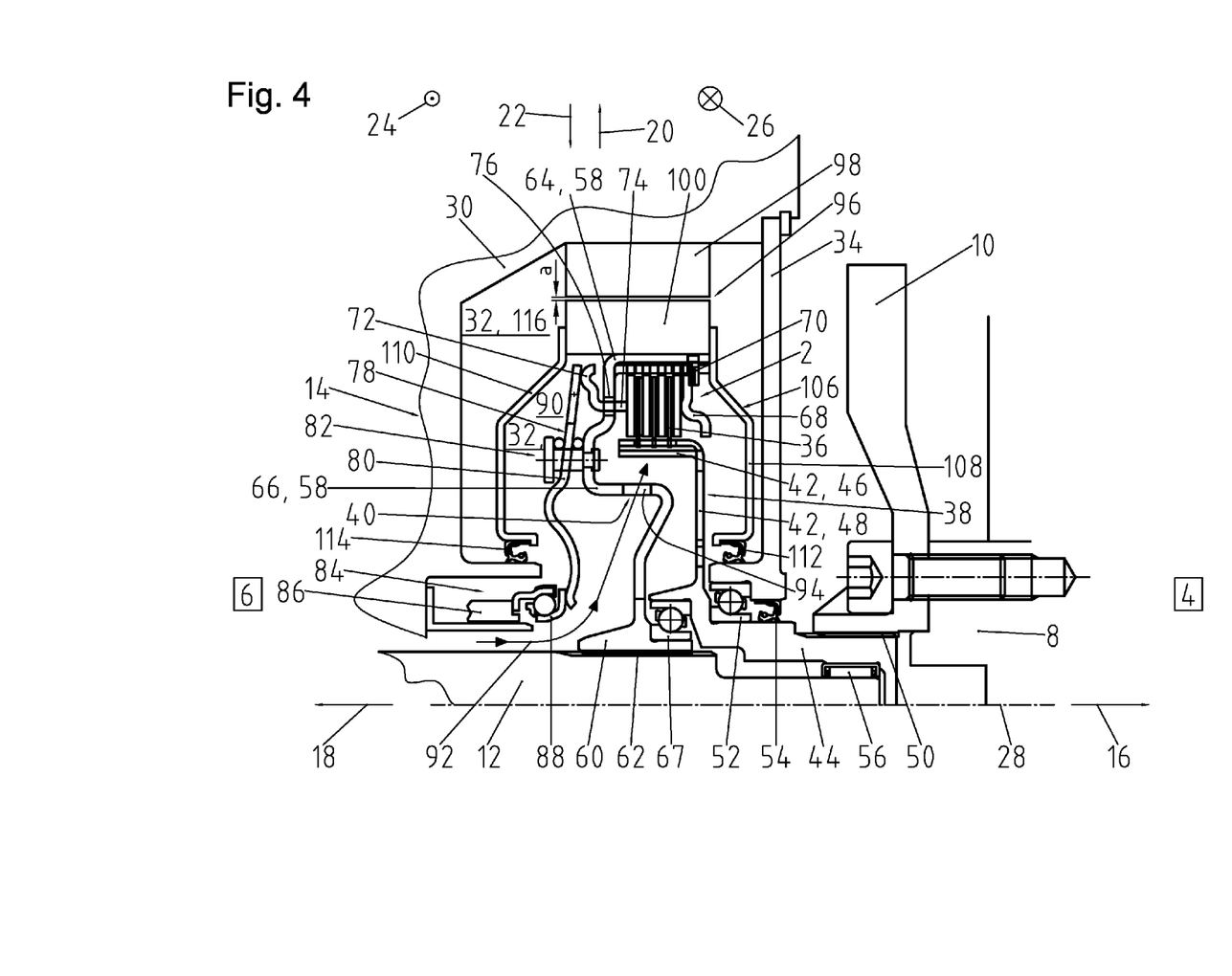
FIG. 4 shows, in a sectional illustration, a partial side view of the first clutch in the drivetrain according to the invention in a fourth embodiment.

FIG. 4 shows a fourth embodiment of the first clutch 2 in conjunction with the electric machine 96, wherein the fourth embodiment substantially corresponds to the first embodiment as per FIG. 1, such that only the differences will be discussed below, the same reference signs are used for identical or similar parts, and the above description otherwise applies correspondingly.

Whereas it is the case in the first embodiment as per FIG. 1 that the accommodating space 32 delimited by the transmission housing bell 30 and by the transmission housing cover 34 likewise forms the wet chamber 90, the wet chamber 90 is, in the fourth embodiment as per FIG. 4, delimited by a co-rotating clutch housing 106. In this case, the clutch housing 106 is formed substantially by two housing parts, wherein the first housing part 108 delimits the wet chamber 90 in the axial direction 16, whereas an opposite, second housing part 110 delimits the wet chamber 90 substantially in the axial direction 18. In this case, the two housing parts 108, 110 are fastened to sides of the rotor 100 situated opposite one another in the axial direction 16, 18, such that the rotor 100 likewise forms a housing part which delimits the wet chamber 90 to the outside in the radial direction 20. To the inside in the radial direction 22, the two housing parts 108, 110 are each sealed off with respect to the transmission housing 14 by means of a seal 112, 114, wherein the seal 112 effects sealing with respect to the adjoining transmission housing cover 34 and the seal 114 effects sealing with respect to the transmission housing bell 30 of the transmission housing 14. From the above description and from FIG. 4, it is clear that the clutch housing 106 is thus arranged so as to separate a dry chamber 116, in which the stator 98 of the electric machine 96 is arranged, from the wet chamber 90 within the accommodating space 32 of the transmission housing bell 30. Consequently, no coolant and/or lubricant, which could influence the interaction of the stator 98 and the rotor 100, passes into the gap a between the stator 98 and the rotor 100.

It is pointed out at this juncture that the clutch arrangements described with reference to FIGS. 1 to 4, in particular their support of the actuating and/or closing force, can in themselves constitute an independent invention of inventive character, even if the further constituent parts of the drivetrain described with reference to FIGS. 5 to 7, or the electric machine 96, were omitted.

Figure 5:
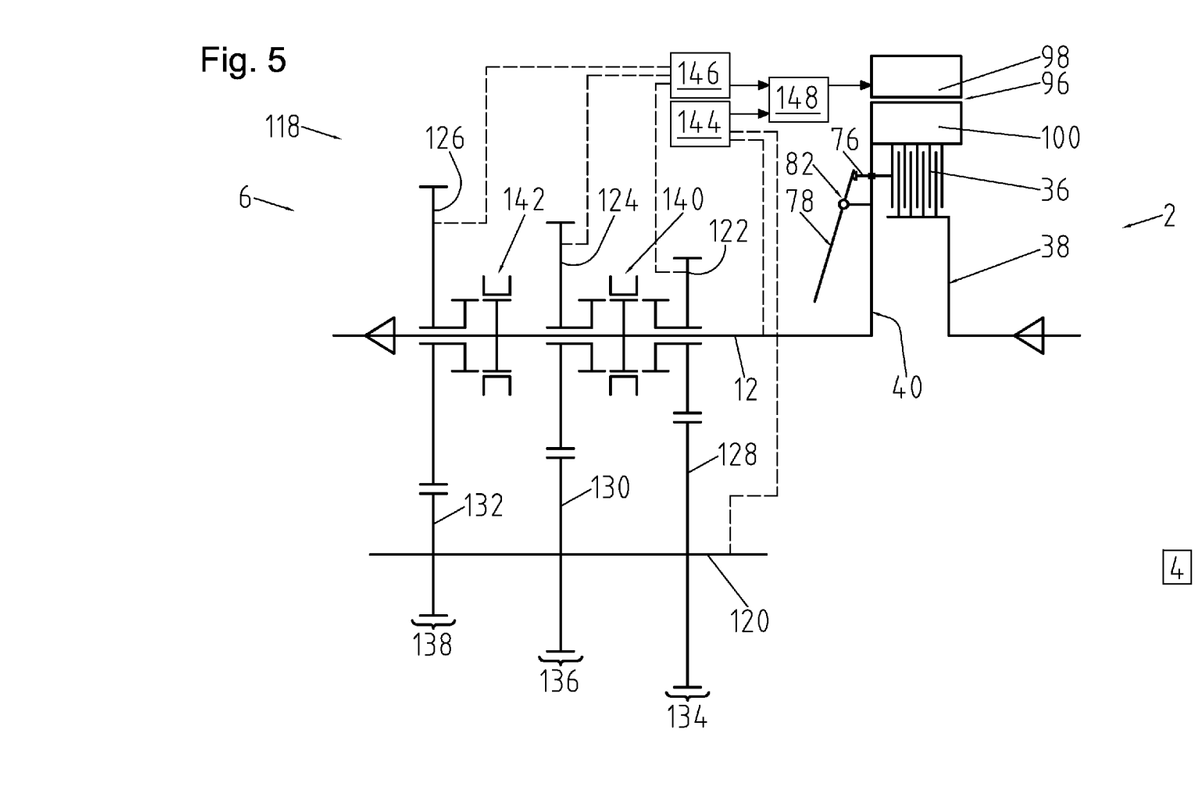
FIG. 5 is a schematic illustration of the drivetrain according to the invention having one of the first clutches from FIGS. 1 to 4 in a first embodiment.

FIG. 5 shows a first embodiment of the drivetrain 118 according to the invention with an embodiment of the first clutch 2 as per any one of FIGS. 1 to 4, wherein the corresponding first clutch 2 together with the electric machine 96 is merely schematically indicated in FIG. 5. The transmission 6 has the first transmission shaft 12, already described above, in the form of a transmission input shaft, which is connected in terms of rotational drive to the output side 40 of the first clutch 2. Furthermore, the transmission 6 has a second transmission shaft 120, wherein the second transmission shaft 120 is a transmission shaft 120 which is connectable in terms of rotational drive to the output side 40. The second transmission shaft 120 is thus downstream of the first transmission shaft 12 in the torque flow within the transmission 6. In the embodiment illustrated, the transmission is in the form of a non-coaxial transmission 6 in which the second transmission shaft 120 is arranged parallel to the first transmission shaft 12 and forms the transmission output shaft. It is however pointed out at this juncture that the claimed teaching can also relate to other or further transmission shafts within the transmission 6.

Three first gearwheels 122, 124 and 126 are arranged on the first transmission shaft 12, whereas three second gearwheels 128, 130, 132 are arranged on the second transmission shaft 120, wherein the first gearwheel 122 and the second gearwheel 128 mesh in terms of rotational drive and form a first gear set 134 for forming a first forward gear. Correspondingly, the first gearwheel 124 and the second gearwheel 130 mesh in terms of rotational drive so as to form a second gear set 136 for forming a second forward gear. Correspondingly, the first gearwheel 126 is connected in terms of rotational drive to the second gearwheel 132 so as to form a third gear set 138 for forming a third forward gear. A further dedicated gear set for forming a reverse gear is dispensed with, and instead, the transmission 6 can, by means of the first, second or third gear set 134, 136, 138, be operated in a reverse gear by way of the electric machine 96 by reversal of the rotational direction of the rotor 100. In this case, operation in the reverse gear is preferably realized exclusively by way of the electric machine 96. By contrast, in the forward gears, the transmission 6 can be operated both by means of the drive unit 4, with the first clutch 2 closed, and by means of the electric machine 96, with the first clutch 2 open. The transmission 6 is in the form of an automated manual transmission or automatic transmission, such that the actuating force for actuating the second clutches, described in more detail further below, is not determined by the operating force applied to a corresponding manually operated gearshift means by the operator.

In the first embodiment as per FIG. 5, the first gearwheels 122, 124, 126 are each in the form of floating gears, wherein these are selectively connectable in terms of rotational drive to the first transmission shaft 12 by means of in each case one second clutch 140, 142. Whereas the first gearwheels 122, 124 are alternately connectable in terms of rotational drive to the first transmission shaft 12 by means of the second clutch 140, the first gearwheel 126 is selectively connectable in terms of rotational drive to the first transmission shaft 12 by means of the second clutch 142. The second clutches 140, 142 are in this case preferably in the form of shift sleeve-type clutches.

Also, the second clutches 140, 142 are substantially in the form of positively locking clutches without a friction component or with only a small friction component. Therefore, in the embodiment illustrated, a clutch body with friction cone and a synchronizing ring with counterpart cone, such as are commonly used in the prior art to effect a synchronizing action, are omitted. In other words, no synchronizing bodies of any form are used.

Also shown in FIG. 5 are means 144 for the direct or indirect detection of the rotational speed of the first and/or second transmission shaft 12, 120 and means 146 for the direct or indirect detection of the rotational speed of the gearwheels in the form of floating gears, in this case of the first gearwheels 122, 124, 126. Said means 144, 146 in turn interact with a control and/or regulation device 148 of the electric machine 96.

The electric machine 96 can, in motor operation, be controlled or regulated by means of the control and/or regulation device 148 so as to cause the rotational speeds of the first transmission shaft 12 and of the first gearwheel 126 to be approximated to or aligned with one another before the closure of the second clutch 142.

Correspondingly, the electric machine 96 can, in motor operation, be controlled or regulated by the control and/or regulation device 148 so as to cause the rotational speeds of the first transmission shaft 12 and of the first gearwheel 124 to be approximated to or aligned with one another before the closure of the second clutch 140 (first closed position). Also, the electric machine 96 can, in motor operation, be controlled or regulated by the control and/or regulation device 148 so as to cause the rotational speeds of the first transmission shaft 12 and of the first gearwheel 122 to be approximated to or aligned with one another before the closure of the second clutch 140 (second closed position). This is effected in each case in that the difference between the rotational speed of the first transmission shaft 12 and the rotational speed of the respective first gearwheel 126, 124, 122 can be reduced or even eliminated through corresponding control or regulation of the electric machine 96 by means of the control and/or regulation device 148. This mode of operation will be described by way of example below, representatively for all of the above-mentioned gearshift processes, on the basis of the second clutch 142 in conjunction with the first gearwheel 126 of the third gear set 138.

Assume firstly that the first clutch 2 is closed, whereas the second clutch 140 has been transferred into the above-mentioned second closed position in which there is a connection in terms of rotational drive between the first transmission shaft 12 and the first gearwheel 122. Consequently, the transmission 6 is operated in the first forward gear, wherein the drive is imparted by means of the drive unit 4. If the operator initiates a gearshift process into the third forward gear, the first clutch 2 is opened, whereas the second clutch 140 is transferred into the neutral position shown in FIG. 5, in which there is no longer a connection in terms of rotational drive between the first transmission shaft 12 and the first gearwheel 122. During the further course of the gearshift process, the means 144 determines the rotational speed of the first transmission shaft 12, whereas the means 146 detects the rotational speed of the first gearwheel 126 of the third gear set 138, wherein the determined values are transmitted to the control and/or regulation device 148. The difference between the detected rotational speed of the first transmission shaft 12 and the detected rotational speed of the first gearwheel 126 is determined within the control and/or regulation device 148. Based on the difference thus determined, the electric machine 96 is, in motor operation, controlled or regulated by the control and/or regulation device 148 such that the difference between the rotational speeds is reduced or even eliminated. In other words, the rotational speeds of the first transmission shaft 12 and of the first gearwheel 126 are approximated to or aligned with one another. When the rotational speeds of the first transmission shaft 12 and of the first gearwheel 126 have been approximated to one another to an adequate extent or even aligned with one another, the second clutch 142 is closed so as to produce the connection in terms of rotational drive between the first transmission shaft 12 and the first gearwheel 126. In this case, the control or regulation of the electric machine 96 and the closure of the second clutch 142 are automated, such that the operator need merely actuate a manually operated gearshift means or operating switch or initiate the shift process.

Figure 6:
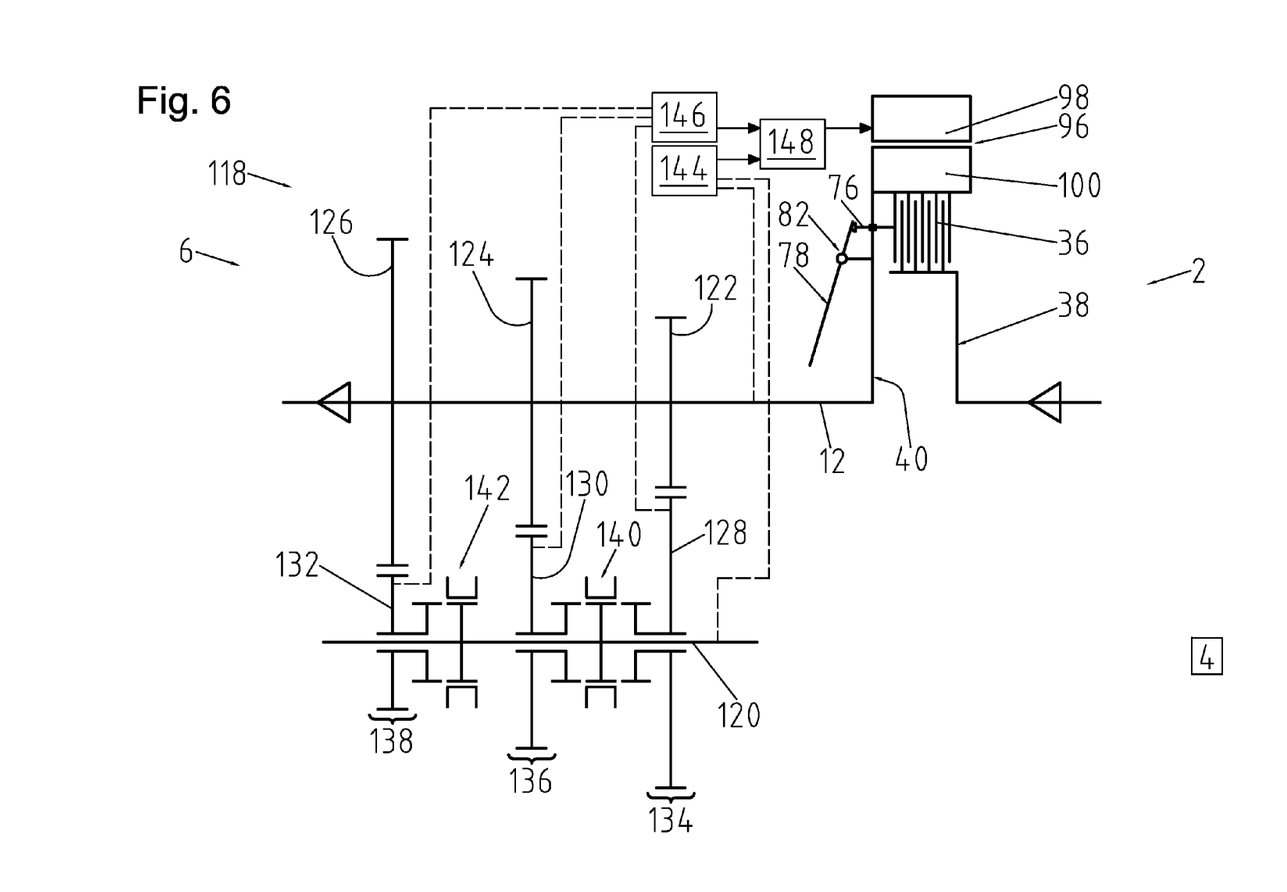
FIG. 6 is a schematic illustration of the drivetrain according to the invention having one of the first clutches from FIGS. 1 to 4 in a second embodiment.

FIG. 6 shows a second embodiment of the drivetrain 118 according to the invention, which corresponds substantially to the first embodiment as per FIG. 5, such that only the differences will be discussed below, the same reference signs are used for identical or similar parts, and the above description of the first embodiment otherwise applies correspondingly.

In the second embodiment as per FIG. 6, the second gearwheels 128, 130, 132 are in the form of floating gears, whereas the first gearwheels 122, 124, 126 are in the form of fixed gears. The second clutches 140, 142 are also provided on the second transmission shaft 120 in order that the second gearwheels 128, 130, 132, which are in the form of floating gears, can be selectively connected in terms of rotational drive to the second transmission shaft 120. As is already the case in the first embodiment as per FIG. 5, the means 146 serve for detecting the rotational speeds of the floating gears of the transmission 6, in this case the rotational speeds of the second gearwheels 128, 130, 132, whereas the means 144 serve for detecting the rotational speed of the second transmission shaft 120.

Figure 7:
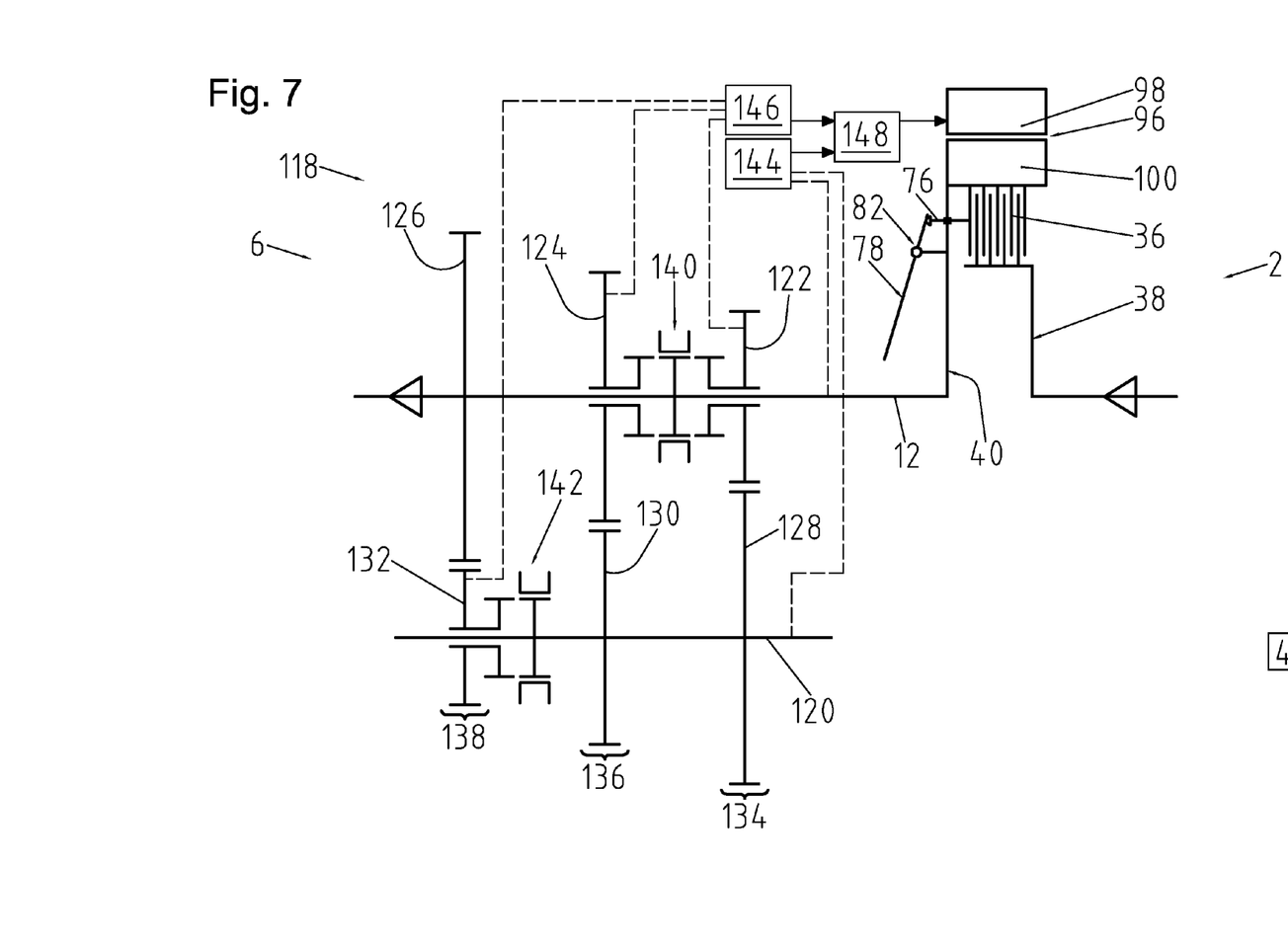
FIG. 7 is a schematic illustration of the drivetrain according to the invention having one of the first clutches from FIGS. 1 to 4 in a third embodiment.

FIG. 7 shows a third embodiment of the drivetrain 118 according to the invention, wherein the third embodiment corresponds substantially to the first embodiment as per FIG. 5, such that only the differences will be discussed below, the same reference signs are used for identical or similar parts, and the above description otherwise applies correspondingly.

By contrast to the first embodiment as per FIG. 5, the first gearwheel 126 is in the form of a fixed gear, whereas the second gearwheel 132 is in the form of a floating gear. Accordingly, the second clutch 142 is also arranged on the second transmission shaft 120 in order to enable the second gearwheel 132 to be selectively connected in terms of rotational drive to the second transmission shaft 120 by means of the second clutch 142. As has already been discussed with regard to the two embodiments described above with reference to FIGS. 5 and 6, the means 146 in turn serve for the indirect or direct detection of the rotational speeds of the gearwheels in the form of floating gears, in this case of the first gearwheels 122 and 124 and of the second gearwheel 132. The means 144 serve both for the detection of the rotational speed of the first transmission shaft 12 and for the detection of the rotational speed of the second transmission shaft 120.

Figure 8:
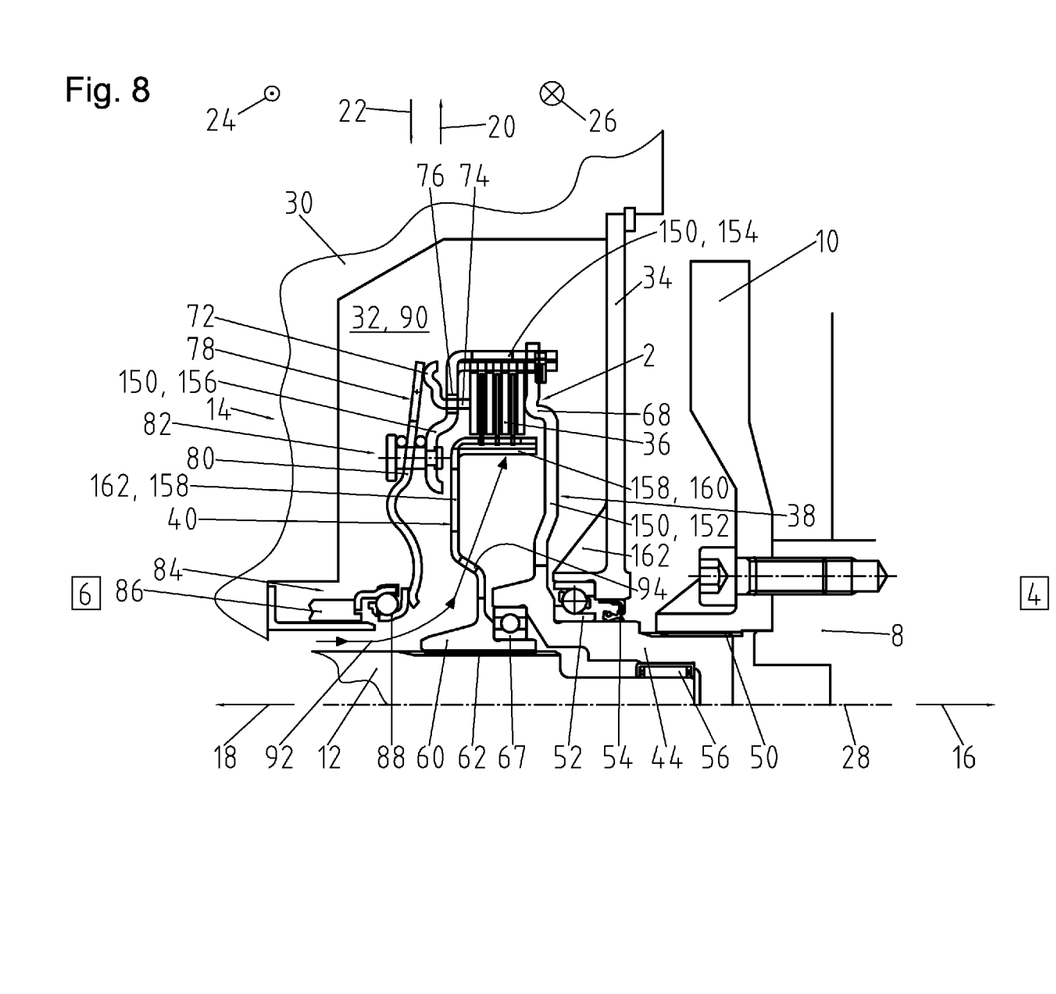
FIG. 8 shows, in a sectional illustration, a side view of a first clutch in an intermediate development of the drivetrain according to the invention.

FIG. 8 shows a clutch arrangement which substantially corresponds to the clutch arrangement of FIG. 1, such that only the differences will be discussed below, the same reference signs are used for identical or similar parts, and the above description otherwise applies correspondingly.

In the embodiment of FIG. 8, an electric machine 96 is omitted. The input side 38 has the clutch input hub 44, wherein the rest of the input side 38 is formed substantially by an outer plate carrier 150, by a radial support section 152 connected to the clutch input hub 44, and by a plate-holding section 154 which follows the radial support section 152. By contrast, the holding device 82 is fastened to a radial section 156, situated opposite the radial support section 152, of the outer plate carrier 150, wherein the radial section 156 does not perform any supporting function in the radial direction 22 in the embodiment illustrated. The above-mentioned windows 76 for the actuating fingers 74 of the force-transmitting element 72 are also provided in the radial section 156. By contrast, the output side 40 is formed by the clutch output hub 60 in conjunction with an inner plate carrier 158 which has a plate-holding section 160 and a radial support section 162 adjoining the plate-holding section 160 in the axial direction 18, which radial support section 162 is, to the inside in the radial direction 22, connected rotationally conjointly to the clutch output hub 60. In this simplified variant, the mass to be synchronized is low because the inner plates of the plate pack 36 and the inner plate carrier 158, which is small in relation to the outer plate carrier 150, are supported on and connected rotationally conjointly to the first transmission shaft 12. In this case, too, the actuating and/or closing force is supported on the transmission housing cover 34, wherein the support may also be realized in the manner described with reference to FIGS. 2 to 4.
2 First clutch
4 Drive unit
6 Transmission
8 Output shaft
10 Flywheel
12 First transmission shaft
14 Transmission housing
16 Axial direction
18 Axial direction
20 Radial direction
22 Radial direction
24 Circumferential direction
26 Circumferential direction
28 Axis of rotation
30 Transmission housing bell
32 Accommodating space
34 Transmission housing cover
36 Plate pack
38 Input side
40 Output side
42 Inner plate carrier
44 Clutch input hub
46 Plate-holding section
48 Radial support section
50 Spline toothing
52 Radial and axial bearing
54 Seal
56 Radial bearing
58 Outer plate carrier
60 Clutch output hub
62 Spline toothing
64 Plate-holding section
66 Radial support section
67 Radial and axial bearing
68 Support part
70 Securing ring
72 Force-transmitting element
74 Actuating finger
76 Window
78 Spring device
80 Plate spring
82 Holding device
84 Actuating device
86 Actuating piston
88 Disengagement bearing
90 Wet chamber
92 Supply path
94 Recesses
96 Electric machine
98 Stator
100 Rotor
102 Stiffening rib
104 Securing ring
106 Clutch housing
108 First housing part
110 Second housing part
112 Seal
114 Seal
116 Dry chamber
118 Drivetrain
120 Second transmission shaft
122 First gearwheel
124 First gearwheel
126 First gearwheel
128 Second gearwheel
130 Second gearwheel
132 Second gearwheel
134 First gear set
136 Second gear set
138 Third gear set
140 Second clutch
142 Second clutch
144 Rotational speed detection means
146 Rotational speed detection means
148 Control and/or regulation device
150 Outer plate carrier
152 Radial support section
154 Plate-holding section
156 Radial section
158 Inner plate carrier
160 Plate-holding section
162 Radial support section
a Gap

We claim:

1. A drivetrain having a first clutch, which has an input side and an output side which is selectively connectable in terms of rotational drive to the input side, and having a transmission, which has a transmission shaft which is connected or connectable in terms of rotational drive to the output side and which is selectively connectable in terms of rotational drive to a gearwheel by means of a second clutch, wherein a rotor of an electric machine is arranged on the output side, and the electric machine, in motor operation, can be controlled or regulated so as to cause the rotational speeds of the transmission shaft and of the gearwheel to be approximated to or aligned with one another before the closure of the second clutch, wherein the second clutch operates without a synchronizing body.

2. The drivetrain as claimed in claim 1, further comprising means for directly or indirectly detecting the rotational speed of the transmission shaft and of the gearwheel, said means interacting with a control or regulation device of the electric machine such that the difference between the rotational speed of the transmission shaft and the rotational speed of the gearwheel can be reduced or eliminated.

3. The drivetrain as claimed in claim 1, wherein the rotor is arranged on the outside of the first clutch in a radial direction or is in a nested arrangement with the first clutch in a radial direction.

4. The drivetrain as claimed in claim 1, wherein the first clutch is in the form of a multiplate clutch, the output side of which is preferably in the form of an outer plate carrier, wherein the rotor is particularly preferably arranged on a plate-holding section of the outer plate carrier or in a nested arrangement with a plate pack of the multiplate clutch in a radial direction.

5. The drivetrain as claimed in claim 1, wherein the first clutch comprises at least one of a starting separating clutch or a normally closed clutch.

6. The drivetrain as claimed in claim 1, wherein the first clutch is a wet-running clutch, the first clutch is arranged in a wet chamber, wherein the wet chamber is delimited by a static transmission housing bell or by a co-rotating clutch housing, and the clutch housing is arranged within a transmission housing bell so as to separate a dry chamber, in which a stator of the electric machine is arranged, from the wet chamber.

7. The drivetrain as claimed in claim 1, wherein the first clutch is assigned a spring device, for applying the closing force.

8. The drivetrain as claimed in claim 1, wherein the first clutch is assigned a possibly hydraulic actuating device which is configured so as to be static or fixed with respect to a housing and which is decoupled in terms of rotational drive from the first clutch or from a spring device, by way of a disengagement bearing.

9. The drivetrain as claimed in claim 7, wherein a closing force of the spring device and/or an actuating force of an actuating device is supportable or supported on a transmission housing or transmission housing cover, on an output shaft, which is connected in terms of rotational drive to the input side, of a drive unit, or on the transmission shaft.

10. The drivetrain as claimed in claim 1, wherein the transmission comprises an automated manual transmission or an automatic transmission.

11. The drivetrain as claimed in claim 1, wherein the transmission includes at least one gear set forming a forward gear, wherein the transmission can, by means of the same gear set, be operated in a reverse gear by way of the electric machine, preferably exclusively by way of the electric machine, or by reversal of the rotational direction of the rotor.

12. A method for performing gearshifts in a transmission within a drivetrain having a first clutch which has an input side and an output side, a transmission, which has a transmission shaft which is connected or connectable in terms of rotational drive to the output side and which is selectively connectable in terms of rotational drive to a gearwheel by means of a second clutch, wherein a rotor of an electric machine is arranged on the output side, and the electric machine comprising:
opening the first clutch,
controlling or regulating the electric machine in motor operation so as to cause the rotational speeds of the transmission shaft and of the gearwheel to be approximated to or aligned with one another, and
closing the second clutch so as to produce a connection in terms of rotational drive between the transmission shaft and the gearwheel after the rotational speeds of the transmission shaft and of the gearwheel have been approximated to or aligned with one another without using a synchronizing body.

13. The method as claimed in claim 12, wherein the rotational speed of the transmission shaft and the rotational speed of the gearwheel are indirectly or directly detected, wherein the control or regulation of the electric machine is performed so as to reduce or eliminate the difference between the rotational speed of the transmission shaft and the rotational speed of the gearwheel.

14. The method as claimed in claim 12, wherein the control or regulation of the electric machine or the closure of the second clutch are/is automated.

15. The method as claimed in claim 12, wherein the transmission is, by means of a gear set for forming a forward gear, operated in a reverse gear by way of the electric machine, by way of the electric machine, or by reversal of the rotational direction of the rotor.

16. The drivetrain as claimed in claim 7 wherein the spring device comprises a plate spring.

17. A drivetrain having a first clutch, which has an input side and an output side which is selectively connectable in terms of rotational drive to the input side, and having a transmission, which has a transmission shaft which is connected or connectable in terms of rotational drive to the output side and which is selectively connectable in terms of rotational drive to a gearwheel by means of a second clutch, wherein a rotor of an electric machine is arranged on the output side, and the electric machine, in motor operation, can be controlled or regulated so as to cause the rotational speeds of the transmission shaft and of the gearwheel to be approximated to or aligned with one another before the closure of the second clutch, wherein the first clutch is assigned a spring device, for applying the closing force.

18. A drivetrain having a first clutch, which has an input side and an output side which is selectively connectable in terms of rotational drive to the input side, and having a transmission, which has a transmission shaft which is connected or connectable in terms of rotational drive to the output side and which is selectively connectable in terms of rotational drive to a gearwheel by means of a second clutch, wherein a rotor of an electric machine is arranged on the output side, and the electric machine, in motor operation, can be controlled or regulated so as to cause the rotational speeds of the transmission shaft and of the gearwheel to be approximated to or aligned with one another before the closure of the second clutch, wherein the rotor is arranged on the outside of the first clutch in a radial direction or is in a nested arrangement with the first clutch in a radial direction.

* * * * *